US010872302B2

(12) United States Patent
Selvaraj et al.

(10) Patent No.: US 10,872,302 B2
(45) Date of Patent: Dec. 22, 2020

(54) AUTOMATICALLY DETERMINING CONSTRUCTION WORKSITE OPERATIONAL ZONES BASED ON RECEIVED CONSTRUCTION EQUIPMENT TELEMETRY DATA

(71) Applicant: Caterpillar Inc., Deerfield, IL (US)

(72) Inventors: Vishnu Gaurav Selvaraj, Trichy (IN); Chad Timothy Brickner, Dunlap, IL (US); Gautham Subramanian, Chennai (IN); Harshavardhan Veluru, Nellore (IN); Siddharth Kamal, Chennai (IN); Chandra Mouli Ravindran, Chennai (IN); Keerthivasan Amuthanathan, Chennai (IN)

(73) Assignee: Caterpillar Inc., Peoria, IL (US)

(*) Notice: Subject to any disclaimer, the term of this patent is extended or adjusted under 35 U.S.C. 154(b) by 84 days.

(21) Appl. No.: 16/219,258

(22) Filed: Dec. 13, 2018

(65) Prior Publication Data
US 2020/0193342 A1  Jun. 18, 2020

(51) Int. Cl.
G06Q 10/06 (2012.01)
G07C 5/08 (2006.01)
(Continued)

(52) U.S. Cl.
CPC ....... G06Q 10/0639 (2013.01); E02F 9/2054 (2013.01); G06Q 50/08 (2013.01);
(Continued)

(58) Field of Classification Search
CPC ....... G06Q 10/063114; G06Q 10/0639; G06Q 50/08; G06Q 50/02
See application file for complete search history.

(56) References Cited

U.S. PATENT DOCUMENTS 4,831,539 A * 5/1989 Hagenbuch ............ G07C 5/085
                                                  701/33.4
6,236,924 B1 * 5/2001 Motz .................... A01B 69/008
                                                  172/4.5
(Continued)

OTHER PUBLICATIONS

Sabillon, Chris A., Audi-Based Productivity Forecasting of Construction Cyclic Activities Georgia Southern University, Fall 2017 (Year: 2017).*

(Continued)

Primary Examiner — Scott L Jarrett
(74) Attorney, Agent, or Firm — Oblon, McClelland, Maier & Neustadt

(57) ABSTRACT

A control system for a machine operating on a worksite includes a telemetry module associated with the machine. The telemetry module generates signals indicative of operational data of the machine. A controller communicably coupled to the telemetry module receives the signals indicative of the operational data from the telemetry module. The controller processes the received signals to create a data model. The controller identifies multiple operational zones over the worksite based at least on an analysis of the created data model. The controller determines occurrence of work cycles of the machine over the worksite based at least on the identified operational zones. The controller determines productivity data of the worksite based at least on the identified work cycles. The controller controls the machine based on the determined productivity data.

14 Claims, 10 Drawing Sheets

(51) Int. Cl.
*E02F 9/20* (2006.01)
*G06Q 50/08* (2012.01)
*H04L 29/08* (2006.01)

(52) U.S. Cl.
CPC ......... *G07C 5/0808* (2013.01); *G07C 5/0841* (2013.01); *H04L 67/125* (2013.01)

(56) References Cited

U.S. PATENT DOCUMENTS

| | | | | |
|---|---|---|---|---|
| 6,356,822 B1* | 3/2002 | Diaz | ................ | G07C 5/008 340/438 |
| 6,697,714 B1* | 2/2004 | Høj | ................ | G07C 1/30 701/1 |
| 8,412,421 B2 | 4/2013 | Greiner et al. | | |
| 8,655,505 B2* | 2/2014 | Sprock | ................ | E02F 9/205 701/2 |
| 9,152,938 B2* | 10/2015 | Lang | ................ | A01B 79/005 |
| 9,616,899 B2 | 4/2017 | Sprock et al. | | |
| 9,663,922 B2* | 5/2017 | Wei | ................ | E02F 9/2045 |
| 9,703,290 B1* | 7/2017 | Vandapel | ................ | E21B 44/00 |
| 9,976,284 B2* | 5/2018 | Hartman | ................ | H05B 45/00 |
| 10,089,863 B2 | 10/2018 | Sugihara et al. | | |
| 10,627,824 B2* | 4/2020 | Runde | ................ | A01B 69/007 |
| 2004/0073468 A1 | 4/2004 | Vyas et al. | | |
| 2008/0059411 A1 | 3/2008 | Greiner et al. | | |
| 2009/0097502 A1* | 4/2009 | Yamamoto | ........ | G05B 19/4185 370/466 |
| 2009/0278839 A1* | 11/2009 | Geis | ................ | G06Q 50/02 345/418 |
| 2011/0153117 A1* | 6/2011 | Koch | ................ | E02F 9/205 701/2 |
| 2011/0153541 A1 | 6/2011 | Koch et al. | | |
| 2011/0160919 A1* | 6/2011 | Orr | ................ | G05D 7/0676 700/283 |
| 2011/0288769 A1* | 11/2011 | Gudat | ................ | G01C 21/343 701/532 |
| 2011/0295423 A1* | 12/2011 | Anderson | ............ | G05D 1/0088 700/248 |
| 2011/0295424 A1* | 12/2011 | Johnson | ............ | G05D 1/0274 700/248 |
| 2012/0136507 A1* | 5/2012 | Everett | ................ | E02F 9/24 701/2 |
| 2012/0136509 A1* | 5/2012 | Everett | ................ | E02F 9/2045 701/2 |
| 2012/0215379 A1* | 8/2012 | Sprock | ................ | E02F 9/2054 701/2 |
| 2013/0311031 A1* | 11/2013 | Friend | ................ | E02F 9/2054 701/26 |
| 2013/0311153 A1* | 11/2013 | Moughler | ............ | E02F 9/205 703/6 |
| 2014/0163779 A1* | 6/2014 | Braunstein | ............ | E02F 9/2054 701/2 |
| 2016/0086391 A1* | 3/2016 | Ricci | ................ | G07C 5/008 701/29.3 |
| 2016/0289922 A1* | 10/2016 | Wei | ................ | G05D 1/0291 |
| 2016/0292920 A1* | 10/2016 | Sprock | ................ | G06T 13/20 |
| 2017/0147958 A1* | 5/2017 | Hatfield | ........ | G06Q 10/063114 |
| 2017/0161972 A1* | 6/2017 | Moloney | ................ | G07C 5/0866 |
| 2017/0284072 A1* | 10/2017 | Jensen | ................ | G07C 5/008 |
| 2017/0286886 A1* | 10/2017 | Halepatali | ............ | G08G 1/202 |
| 2017/0314232 A1* | 11/2017 | Chi | ................ | E02F 9/2054 |
| 2018/0088591 A1* | 3/2018 | Friend | ................ | E02F 9/2054 |
| 2018/0335784 A1* | 11/2018 | Wei | ................ | E02F 9/261 |
| 2019/0196483 A1* | 6/2019 | Uemura | ................ | A01D 34/66 |
| 2019/0325669 A1* | 10/2019 | Flood | ................ | G07C 5/02 |
| 2019/0370725 A1* | 12/2019 | Ha | ................ | E02F 9/262 |
| 2019/0370726 A1* | 12/2019 | Ha | ........ | G06Q 10/063114 |
| 2020/0117201 A1* | 4/2020 | Oetken | ................ | G05D 1/0044 |

OTHER PUBLICATIONS

Montaser, Ali et al., Tracking Hauling Trucks for Cut-Fill Earthmoving Operations Engineering, Computer Science ITcon, 2014 (Year: 2014).*

Sherafat, Behnam et al., Automated Methods for Activity Recognition of Construction Workers and Equipment: State-of-the-Art Review, Journal of Construction Engineering Management, vol. 146, No. 6, 2020 (Year: 2020).*

* cited by examiner

AUTOMATICALLY DETERMINING CONSTRUCTION WORKSITE OPERATIONAL ZONES BASED ON RECEIVED CONSTRUCTION EQUIPMENT TELEMETRY DATA

TECHNICAL FIELD

The present disclosure relates to managing productivity of a worksite. More specifically, the present disclosure relates to managing productivity of the worksite using telemetry data.

BACKGROUND

Mining, construction, and other large-scale excavating operations require fleets of digging, loading, and hauling machines to remove and transport excavated material such as ore or overburden from an area of excavation to a predetermined destination. For such an operation to be profitable, the fleet of machines must be productively and efficiently operated. Many factors can influence productivity and efficiency at a worksite including, among other things, site conditions (i.e., rain, snow, ground moisture levels, material composition, visibility, terrain contour etc.), machine conditions (i.e., age, state of disrepair, malfunction, fuel grade in use, etc.), and operator conditions (i.e., experience, skill, dexterity, ability to multi-task, machine or worksite familiarity, etc.). Unfortunately, when operations at a worksite are unproductive or inefficient, it can be difficult to determine which of these factors is having the greatest influence and should be addressed.

Tracking productivity of the worksite is a complex task and may require various input parameters. There are various means to track productivity of the worksite. Advanced analytics modules may be used by the machines operating on the worksite to keep track of productivity of the machine in which the module is installed, as well as accompanying machines, and thereby the worksite. However, such devices collect data pertaining to a lot of parameters through various sensors etc. Typically, such devices are quite expensive and pose a substantial economic burden on a user towards cost of the machine.

Therefore, there is a need to determine productivity data of the machine through inexpensive means, which may allow a user to track productivity of the worksite in an efficient manner.

SUMMARY

In an aspect of the present disclosure, a control system for a machine operating on a worksite is provided. The control system includes a telemetry module associated with the machine. The telemetry module generates signals indicative of operational data of the machine. The control system further includes a controller communicably coupled to the telemetry module. The controller receives the signals indicative of the operational data from the telemetry module. The controller processes the received signals to create a data model. The controller identifies multiple operational zones over the worksite based at least on an analysis of the created data model. The controller determines occurrence of work cycles of the machine over the worksite based at least on the identified operational zones. The controller determines productivity data of the worksite based at least on the identified work cycles. The controller further controls the machine based on the determined productivity data.

In another aspect of the present disclosure, a worksite management system is provided. The worksite management system includes multiple machines operating on a worksite. Each machine from the plurality of machines has an associated telemetry module such that the telemetry module generates signals indicative of operational data of the corresponding machine from the plurality of machines. The worksite management system further includes a controller communicably coupled with the plurality of machines. The controller receives the signals indicative of the operational data of the plurality of machines from the corresponding telemetry modules. The controller processes the received signals to create a data model. The controller identifies plurality of operational zones over the worksite based at least on an analysis of the created data model. The controller determines occurrence of work cycles of each machine from the plurality of machines over the worksite based at least on the identified operational zones. The controller determines productivity data of the worksite based at least on the identified work cycles of each machine from the plurality of machines. The controller manages the worksite by controlling the plurality of machines based on the determined productivity data.

In yet another aspect of the present disclosure, a control system includes a first machine operating at a worksite. The first machine has a first telemetry module which generates signals indicative of operational data of the first machine. The control system includes at least one second machine operating at the worksite. The at least one second machine has a second telemetry module which generates signals indicative of operational data of the at least one second machine. The control system further includes a controller associated with the first machine, and communicably coupled with the at least one second machine. The controller receives the signals indicative of the operational data from the first telemetry module. The controller processes the received signals to create a data model. The controller receives the signals indicative of the operational data from the second telemetry module. The controller processes the received signals to revise the created data model. The controller identifies plurality of operational zones over the worksite based at least on an analysis of the revised data model. The controller determines occurrence of work cycles of the first machine based at least on the identified operational zones. The controller determines productivity data of the worksite based at least on the identified work cycles of the first machine. The controller further controls the first machine based on the determined productivity data.

Other features and aspects of this disclosure will be apparent from the following description and the accompanying drawings.

DETAILED DESCRIPTION

Figure 1:
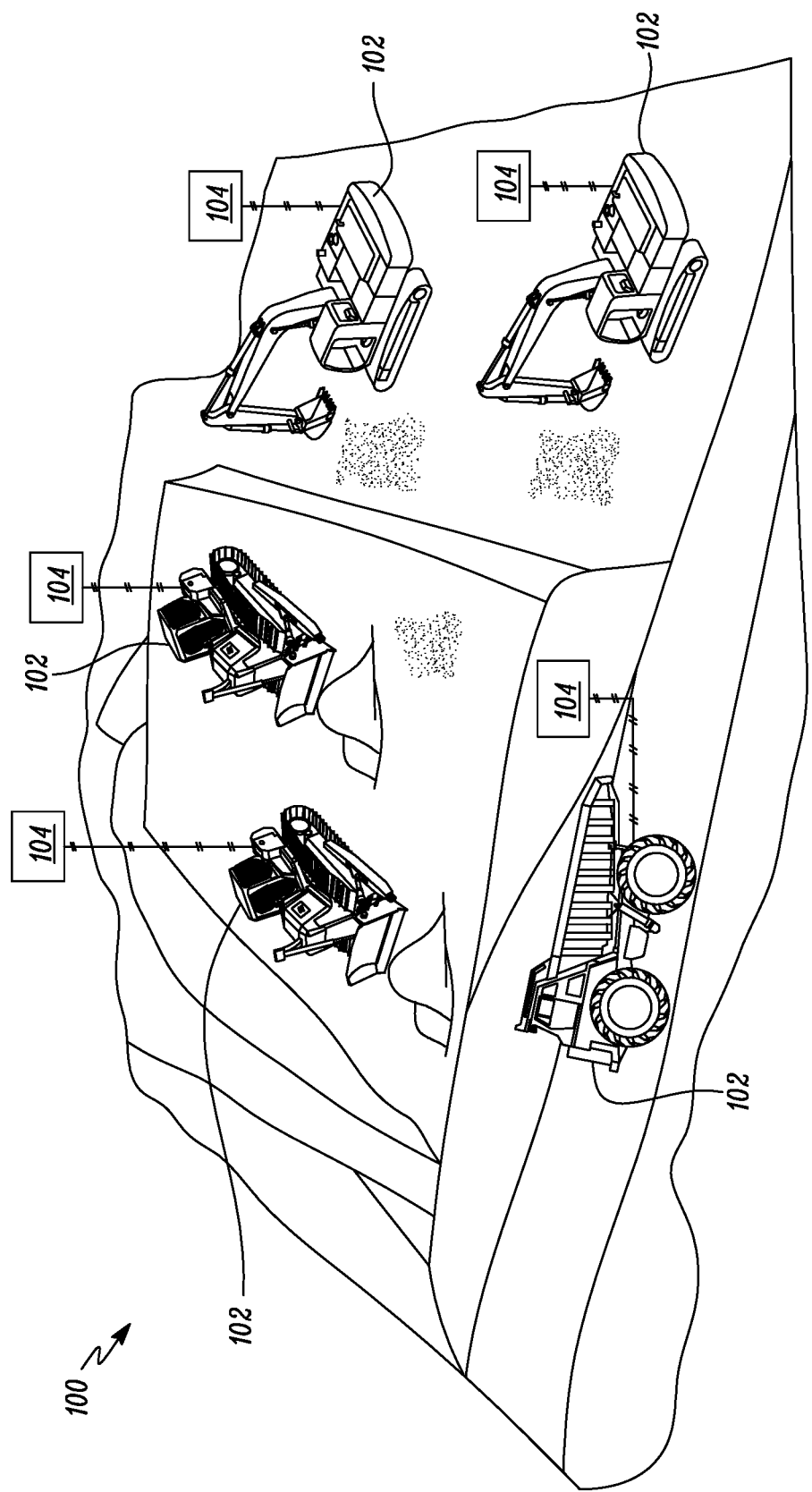
FIG. 1 shows an exemplary worksite having multiple machines working on the worksite, according to an aspect of the present disclosure.

Wherever possible, the same reference numbers will be used throughout the drawings to refer to same or like parts. FIG. 1 illustrates an exemplary worksite 100. Examples of the worksite 100 may include, but are not limited to, a mining site, a landfill, a quarry, a construction site, or any other area in which movement of material is desired.

The worksite 100 includes a plurality of machines 102 working on the worksite 100. The plurality of machines 102 may be employed at the worksite 100 for a variety of earth moving operations, such as dozing, grading, leveling, bulk material removal, or any other type of operation that results in alteration of topography of the worksite 100. The worksite 100 may be typically divided into various zones such as a parking zone, a loading zone, a dumping zone etc. The plurality of machines 102 may accordingly perform various operations in corresponding zones on the worksite 100. Each machine from the plurality of machines 102 may be a dozer, a loader, a dump truck, an excavator or any other type of machine which may be suitable for application with various aspects of the present disclosure.

Each machine from the plurality of machines 102 has an associated telemetry module 104. The telemetry module 104 generates signals indicative of operational data of the machine 102 with which the telemetry module 104 is associated. The operational data may include, but is not limited to, one or more of a machine speed, a machine location timestamp, machine GPS data, machine fuel consumption, and engine start and stop occurrences coupled with GPS data. The telemetry module 104 may include appropriate sensing hardware to collect operational data.

Figure 2:
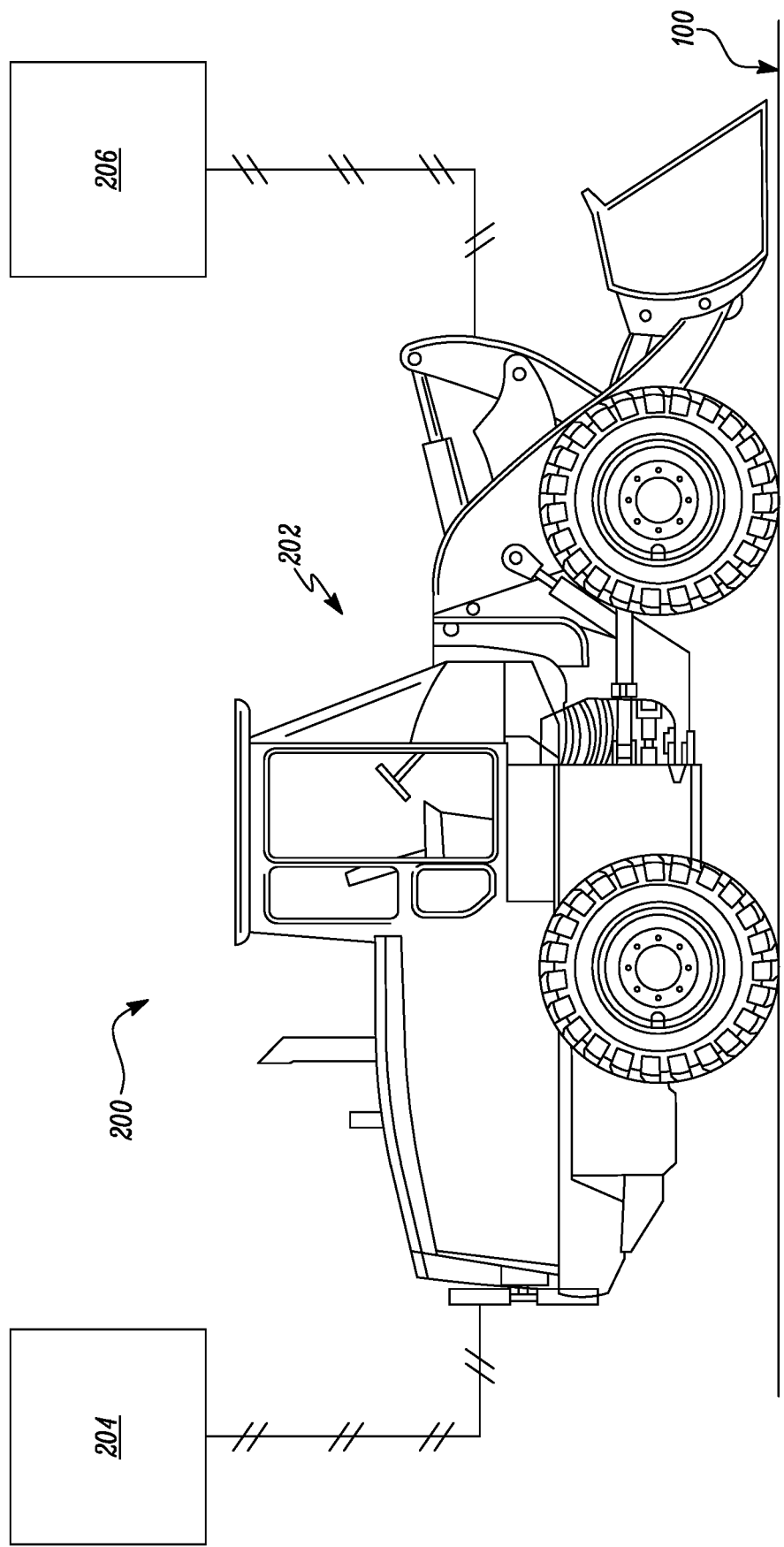
FIG. 2 schematically shows a control system for one of the machines working on the worksite, according to an aspect of the present disclosure.

FIG. 2 shows a schematic illustration of a control system 200 for a machine 202 operating on the worksite 100. The control system 200 includes the machine 202 and a telemetry module 204 associated with the machine 202. The telemetry module 204 is similar to the telemetry module 104 explained with reference to FIG. 1. The control system 200 further includes a controller 206. The controller 206 is configured to control various operational aspects of the machine 202.

The controller 206 may be any electronic controller or computing system including a processor which operates to perform operations, executes control algorithms, stores data, retrieves data, gathers data, and/or performs any other computing or controlling task desired. The controller 206 may be a single controller or may include more than one controller disposed to control various functions and/or features of the machine. The controller 206 includes an associated memory 208. The controller 206 may be otherwise connected to an external memory (not shown), such as a database or server. The associated memory 208 and/or external memory may include, but are not limited to including, one or more of read only memory (ROM), random access memory (RAM), a portable memory, and the like.

The controller 206 may be located on-board the machine 202, or at an off-board location relative to the machine 202 such as an online server. The present disclosure is not limited by the physical presence of the controller 206 at the worksite 100. The controller 206 is communicably coupled to the telemetry module 204. The controller 206 receives the signals indicative of the operational data from the telemetry module 204. The controller 206 processes the received signals to create a data model. The received signals are processed in various steps to create the data model.

Figure 3:
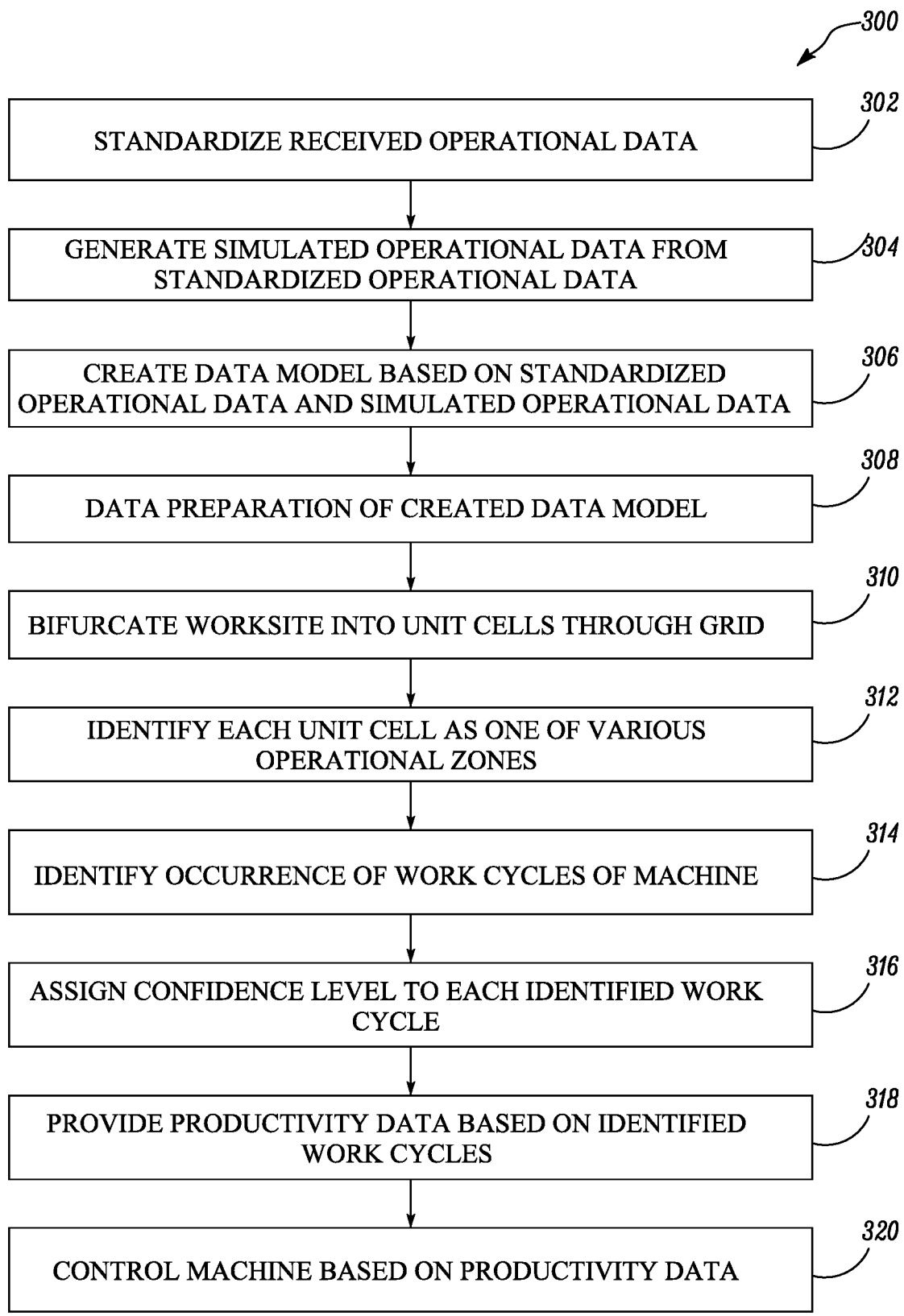
FIG. 3 shows various data processing steps for the control system of FIG. 2, according to an aspect of the present disclosure.

FIG. 3 illustrates the various steps of processing of the received signals indicative of the operational data. At step 302, the received operational data is standardized. Standardization of the operational data may include identifying the type of the machine 202 such as a loader or a truck, conversion of units of various parameters to ensure uniformity across values of different parameters, and any other suitable data processing operation which may be applicable with various aspects of the present disclosure.

Figure 4A:
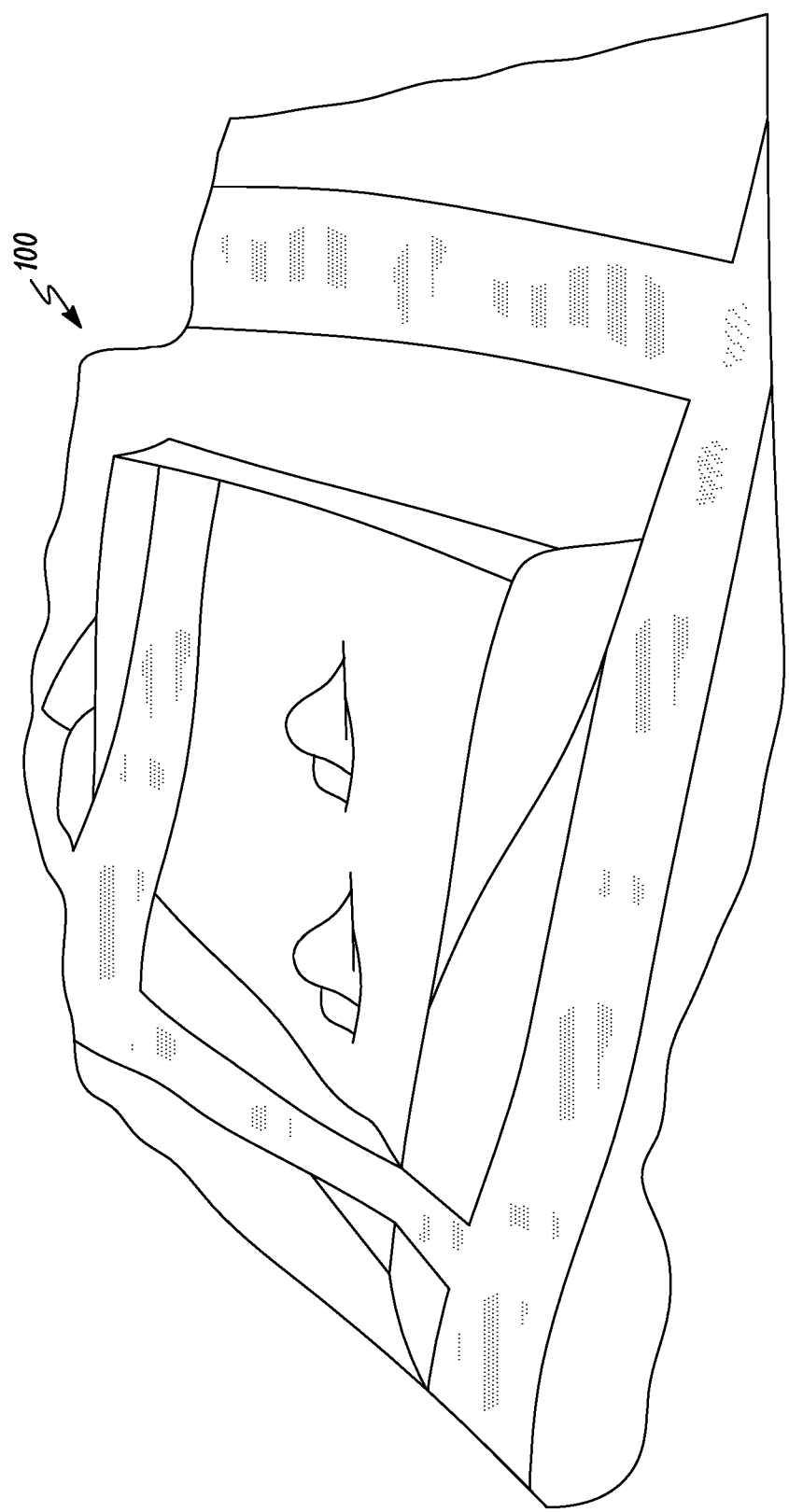
FIG. 4A indicatively shows locations of worksite for which operational data is received through telemetry module of the machines working on the worksite, according to an aspect of the present disclosure.
Figure 4B:
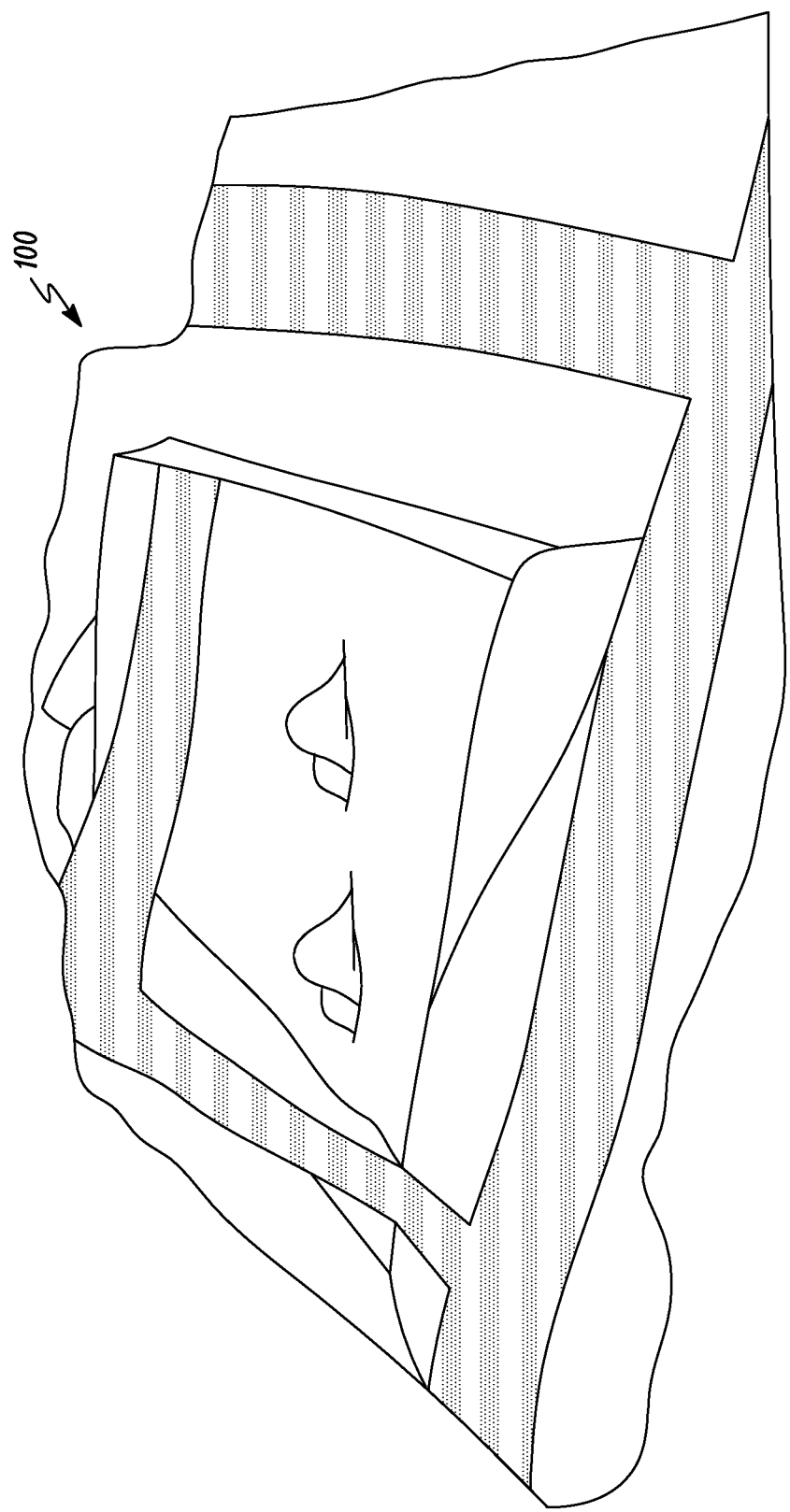
FIG. 4B indicatively shows locations of worksite for which operational data is received through telemetry module of the machines working on the worksite as well as simulated data generated through the received operational data, according to an aspect of the present disclosure.

After standardization of the received operational data, at step 304, the standardized operational data is used to generate simulated operational data corresponding to time periods for which operational data is not collected by the telemetry module 204. It may be possible that the telemetry module 204 may not be able to collect operational data at all times due to various factors such as network unavailability, data collection frequency being low, faulty sensor probes etc. FIG. 4A indicatively shows locations of the worksite 100 for which the operational data is received through shaded area portions. The simulated operational data supplements the received operational data and provides more number of data points to create the data model. FIG. 4B shows the locations of the worksite 100 for which the operational data is received through the telemetry module 204 as well as simulated based on the received operational data through shaded area portions. At step 306, the standardized operational data and the simulated operational data together are used to create the data model. The data model created by the standardized operational data and the simulated operational data provides more correct estimate of the operational aspects of the machine 202.

At step 308, data preparation is done by calculating some pre-determined parameters. These parameters are calculated by referencing the data model before processing the data model further. The data model may be used to calculate a distance travelled by the machine, and a desired duration of travel to traverse that distance. The difference of actual duration of travel and the desired duration of travel to a new point with the same location is assigned as a previous data point. The data model is basically a functional representation of the worksite 100 in terms of geographical location, operational rules such as time taken by the machine 202 to traverse between two points at the worksite 100, speed limits of the machine 202 across various areas on the worksite 100, terrain information, location information on area of operation of the machine 202 etc.

Figure 5:
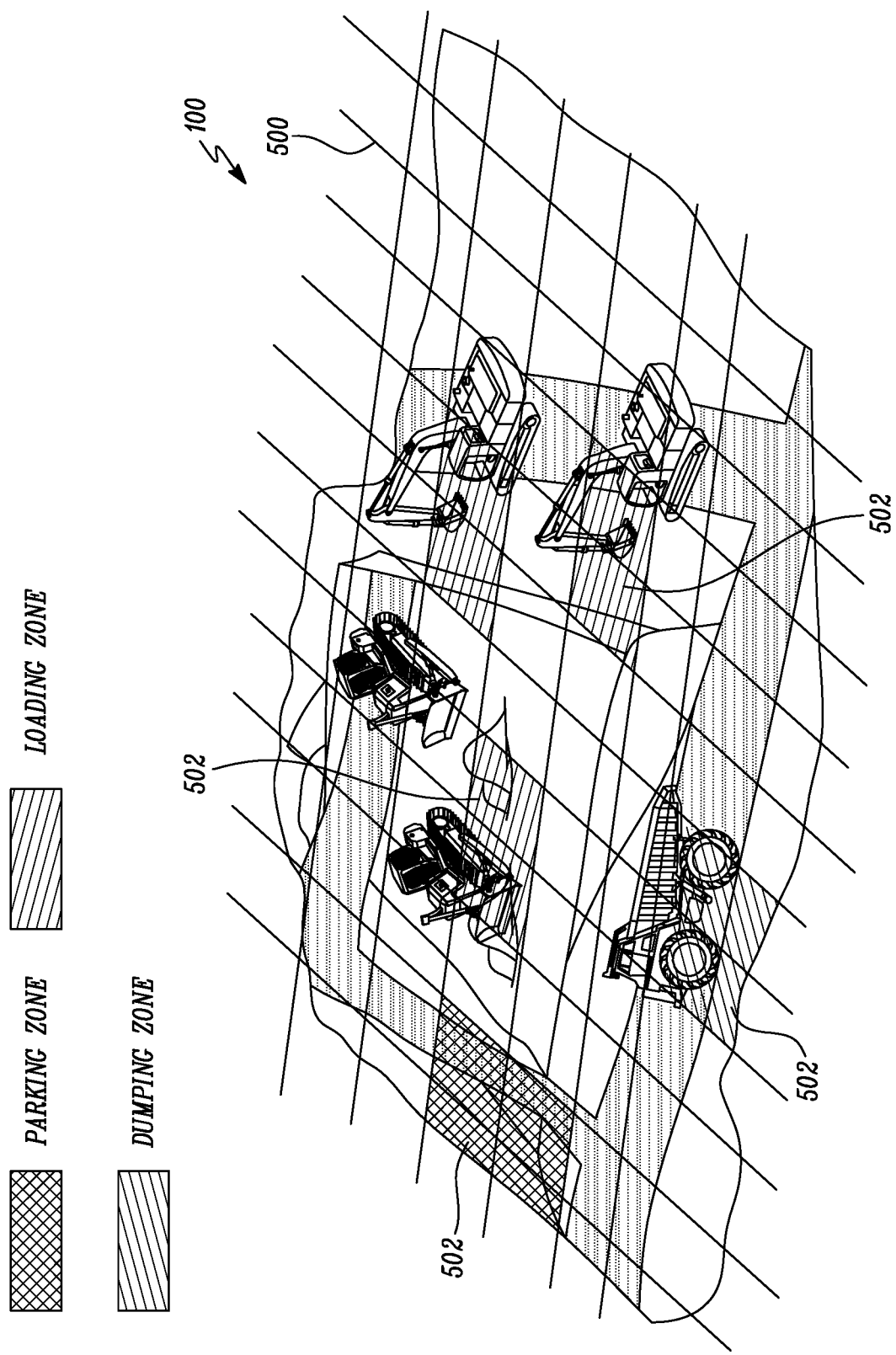
FIG. 5 shows the worksite being divided into unit cells through a grid, according to an aspect of the present disclosure.

The machine 202 works on the worksite 100 across various areas. At step 310, the controller 206 virtually bifurcates the worksite 100 into unit cells 502 through a grid 504. The grid 504 comprises of orthogonal lines running across the worksite 100 and dividing the worksite 100 into the unit cells 502. Each unit cell 502 may have a specific geographical coordinate, terrain information, and other operational information associated with the unit cell 502. The division of the worksite 100 into various unit cells 502 through the grid 504 is illustrated in FIG. 5.

At step 312, the controller 206 now proceeds to identify each unit cell 502 as an operational zone based on the created data model, operational knowledge of working of the worksite 100, and some pre-determined rules stored in the associated memory 208 of the controller 206. With combined reference to FIGS. 4 and 5, the controller 206 primarily identifies whether each unit cell 502 of the grid 504 is a parking zone, a loading zone, or a dumping zone. Various operational zones are indicatively depicted by different shading patterns in FIG. 5.

The controller 206 identifies a unit cell 502 as the parking zone based at least on engine start and stop occurrences and GPS data of the machine 202. The controller 206 identifies the unit cell 502 within which the machine 202 has recorded maximum engine start and stop occurrences. The controller 206 marks such unit cells 502 as the parking zone. Further, if there is an adjacent unit cell 502 which also has recorded substantial number of engine start and stop occurrences of the machine 202, then both the unit cells 502 are clubbed together and marked collectively as the parking zone.

Further, the controller 206 identifies a unit cell 502 as the loading zone based at least on duration of time spent by the machine 202 at a particular location within the unit cell 502 on the worksite 100. The controller 206 identifies the location where the machine 202 has spent maximum time, apart from the already identified parking zone. Such unit cells 502 are marked as the loading zone. Similar to the parking zone identification logic, if adjacent unit cells 502 also display such characteristics, then the adjacent unit cells may be clubbed together and marked collectively as the loading zone.

The controller 206 identifies the unit cells 502 as the dumping zones based at least on a duration of time spent by the machine 202 at a particular location, and a distance of the unit cell 502 from the loading zone. The controller 206 further analyzes the time spent by the machine 202 at various locations on the worksite 100. After excluding the parking zone and the dumping zone, the controller 206 analyzes the data model to identify the locations where the machine 202 has spent maximum time. From these locations, the controller 206 identifies locations on the worksite 100 which are at least a pre-determined distance away from all the loading zones. In an embodiment, the pre-determined distance is 160 meters. However, the pre-determined distance may vary based on type of worksite 100, user preferences, safety norms as per jurisdiction of the worksite 100 etc. Then, the controller 206 identifies unit cells 502 at such locations as the primary dumping zone. Similar to the parking and loading zones, adjacent unit cells identified as the primary dumping zone may be clubbed together and marked collectively as the primary dumping zone. The controller 206 iteratively continues with division of the worksite 100 into various operational zones to the extent possible.

Even though the simulated operational data aids in creating data model with adequate data points, some caveats are taken into account while interpolating the operational data. For the machine 202 having operational data points recorded from more than a pre-determined time period apart, the controller 206 does not process the steps explained herein. In an embodiment, the pre-determined time period is one hour. The pre-determined time period may vary based on various worksite parameters such as network connectivity, location of the worksite 100, communication hardware between the machine 202 and the controller 206 etc. The present disclosure is not limited by the value of pre-determined time period in any manner.

After dividing the worksite 100 into the operational zones to the extent possible, at step 314, the controller 206 now determines occurrence of work cycles of the machine 202. For explanatory purposes, the machine 202 is considered as a loader. A typical work cycle of the machine 202 may include a loading segment, a travelling loaded to dumping zone segment, a dumping segment, and a travelling empty to loading zone segment. In the work cycle occurrence analysis, the controller 206 may at first exclude all the parking zones on the worksite 100 from further analysis to avoid calculation of work cycles in the parking zone. It should be contemplated that the machine 202 will not be performing any operational tasks in the parking zone.

The machine 202 may interact with more than one other machine during a work cycle. The determination of work cycle is carried out with respect to all the machines at the same time to avoid double calculations. The controller 206 may identify the loading segment in case the proximity of the machine 202 with a truck is within a threshold limit. In an embodiment, the threshold limit is 12 meters. However, the present disclosure is not limited by the threshold limit in any manner, and the threshold limit may have any suitable value which is applicable with various aspects of the present disclosure.

The controller 206 may identify the dumping segment by calculating a number of times the truck has entered the dumping zone. All the loading segments and the dumping segments are sorted based on the timestamp, and the controller 206 makes sure that all the loading segments are succeeded by the dumping segment. Any instances of occurrences of the dumping segment succeeding the loading segment may be considered as an outlier and may be discarded by the controller 206.

Further, the controller 206 also checks whether every loading segment is succeeded by the dumping segment. In case, there is no dumping segment after the loading segment, the controller 206 may check for invisible dumping. The controller 206 may check for a location at which the machine 202 may have spent maximum time between two loading segments. Such location may be substantiated by checking that the machine speed is minimum at the location, as well as the location is away from the primary dumping location by at least a pre-determined distance. In an embodiment, the pre-determined distance is 160 meters. However, the pre-determined distance may vary based on type of the worksite 100, user preferences, safety norms as per jurisdiction of the worksite 100.

Further, the controller 206 marks the travelling empty segment as time spent between the dumping segment and the loading segment. The controller 206 marks the travelling loaded segment as time spent between the loading segment and the dumping segment. With variation in type of the machine 202, it may be possible that the work cycle may have any other work cycle segment as well apart from the loading segment, dumping segment, the travelling empty segment, and the travelling loaded segment. In such a scenario, the controller 206 may be provided with appropriate rules and information to identify the work cycle accurately.

The controller 206 calculates a distance travelled and fuel consumed at each work cycle segment. Further, the controller 206 may record information about the machines involved in each work cycle. For example, in an embodiment the machine 202 is a loader, but the machine 202 may also interact with another machine such as a truck. The controller 206 may take into account the machines involved in each work cycle. Each identified work cycle is provided with a work cycle ID.

At step 316, the controller 206 assigns a confidence level to each identified work cycle. The controller 206 may assign a confidence level of 100% to each work cycle identified with the primary dumping zone. For the work cycles with invisible dumping, the controller 206 may assign the confidence level based on parameters such as whether work cycle duration is in range of average work cycle duration of that particular machine in past occurrences, passage of the machine 202 through the parking zone, loading segment identified within proximity of less than a pre-determined distance from the invisible dumping site etc.

After checking out all outliers and making sure that the identified work cycles are valid, at step 318, the controller 206 provides productivity data. The productivity data is provided through output parameters for the machine 202. The output parameters for the machine 202 may include a machine ID, work cycle ID, work cycle start time, work cycle end time work cycle segment division, fuel consumption during the work cycle, fuel consumption during individual work cycle segments, distance travelled during the work cycle, distance travelled during individual work cycle segments, work cycle duration, information about machines used during the work cycle for example mapping between the loader machine and the truck, and confidence level for the work cycle. It should be contemplated that the parameters mentioned herein are for indicative purposes only, and any other such parameter may also be used to define productivity data of the machine 202. The present disclosure is not limited by the output parameters in any manner.

After providing the productivity data, at step 320, the controller 206 may further analyze the productivity data and control the machine 202 accordingly based on the productivity data. The controller 206 may provide alerts to management personnel about the performance of the machine 202 and control the machine 202 accordingly.

Figure 6:
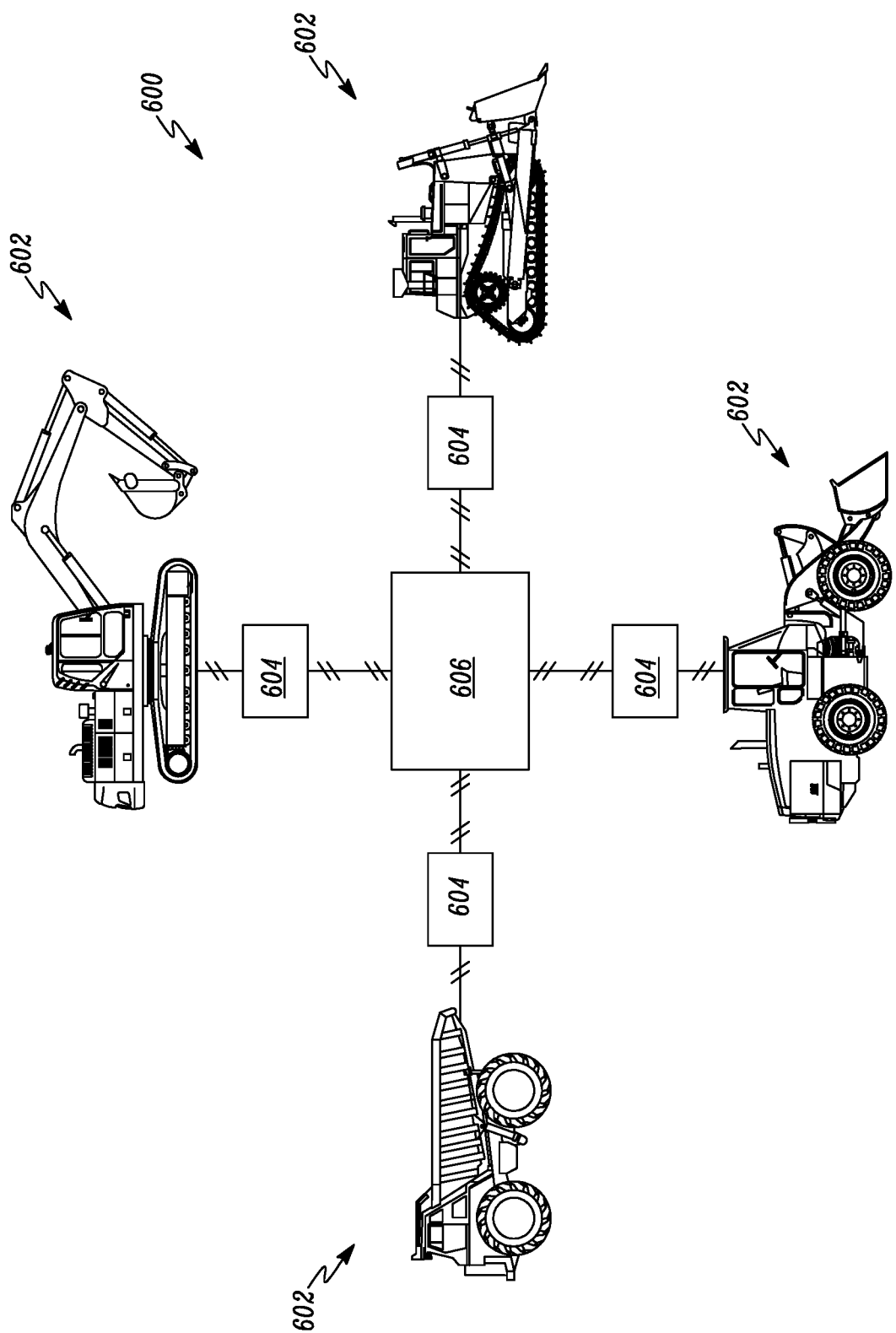
FIG. 6 schematically shows a worksite management system for the worksite, according to another aspect of the present disclosure.

FIG. 6 illustrates another embodiment of the present disclosure. A worksite management system 600 is schematically represented. The worksite management system 600 includes multiple machines 602 working on the worksite 100. Each of the machine 602 from the multiple machines 602 working on the worksite 100 has an associated telemetry module 604. Each of the telemetry module 604 generates signals indicative of the operational data of the corresponding machine 602 from the multiple machines 602. The worksite management system 600 further includes a controller 606 communicably coupled with each of the machines. The controller 606 is communicably coupled with each of the telemetry modules 604 as well. The controller 606 receives signals indicative of the operational data of each of the machine 602 from the corresponding telemetry modules 604.

Figure 7:
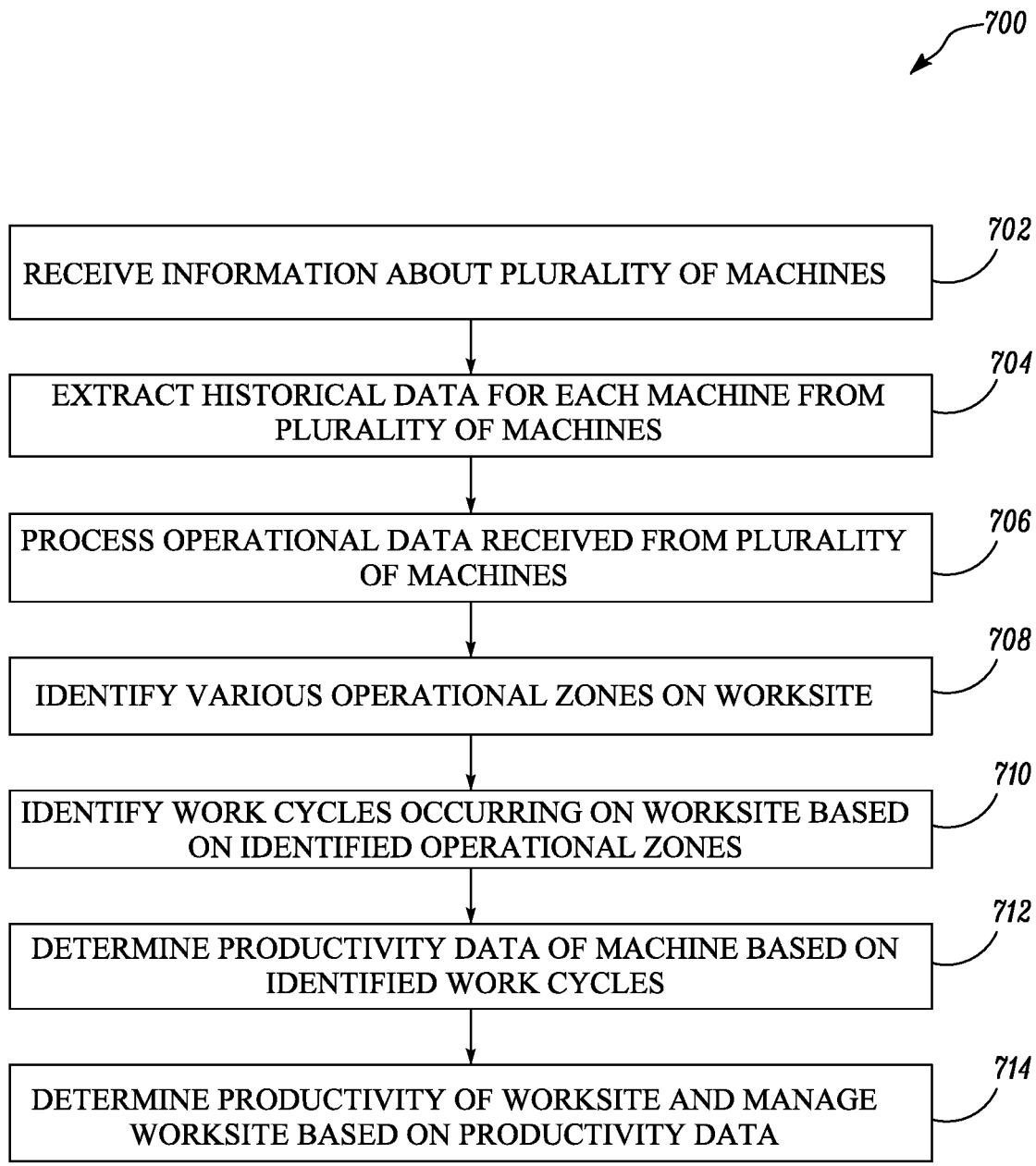
FIG. 7 shows a flow chart for data processing steps for the worksite management system of FIG. 6, according to an aspect of the present disclosure.

The controller 606 processes the received signals and performs similar functions as the controller 606. Various steps of data processing by the controller 606 are shown in FIG. 7. At step 702, the controller 606 receives information about number of machines 602 working on the worksite 100, and the type of the machines 602 working on the worksite 100. The controller 606 classifies the machines 602 working on the worksite 100 as loader, truck, excavator machines etc. At step 704, the controller 606 extracts historical data for each of the machines 602. Historical data may include parameters such as geo co-ordinates, machine speed, fuel consumption information, engine start and stop information etc. It should be contemplated that the parameters mentioned here are merely indicative and other suitable parameters may also be utilized. Further, all the parameters are merged into a single data frame to form the input data layer. Merging the parameters into a single data frame refers to normalizing the data, unit conversions to make parameters compatible with one another etc.

At step 706, the controller 606 processes the operational data received from the multiple machines 602. The operational data may include one or more of the machine speed, machine location timestamp, machine GPS data, machine fuel consumption, and engine start and stop occurrences coupled with GPS data. At step 708, the controller 606 identifies various operational zones on the worksite 100. The operational zones include one or more of the parking zone, the loading zone, and the dumping zone. The controller 606 identifies the parking zone based at least on the engine start and stop occurrences and the GPS data of at least one machine 602 from the plurality of machines 602. The controller 606 identifies the loading zone based at least on the duration of time spent by at least one machine 602 from the plurality of machines 602 at the particular location on the worksite 100. The controller 606 identifies the dumping zone based at least on the duration of time spent by at least one machine 602 from the plurality of machines 602 at a particular location, and the distance of the location from the loading zone.

At step 710, the controller 606 calculates the work cycles occurring on the worksite 100 based on the operational zones for each of the machines 602 from the plurality of machines 602. The controller 606 determines the work cycles based on the data model created as well as various rules and pre-determined information stored with the controller 606. At step 712, the controller 606 determines productivity data for each of the machines 602 from the plurality of machines 602 to the extent possible. Further, at step 714 the controller 606 determines productivity of the worksite 100 based on the calculated productivity data and manages the worksite 100 accordingly.

Figure 8:
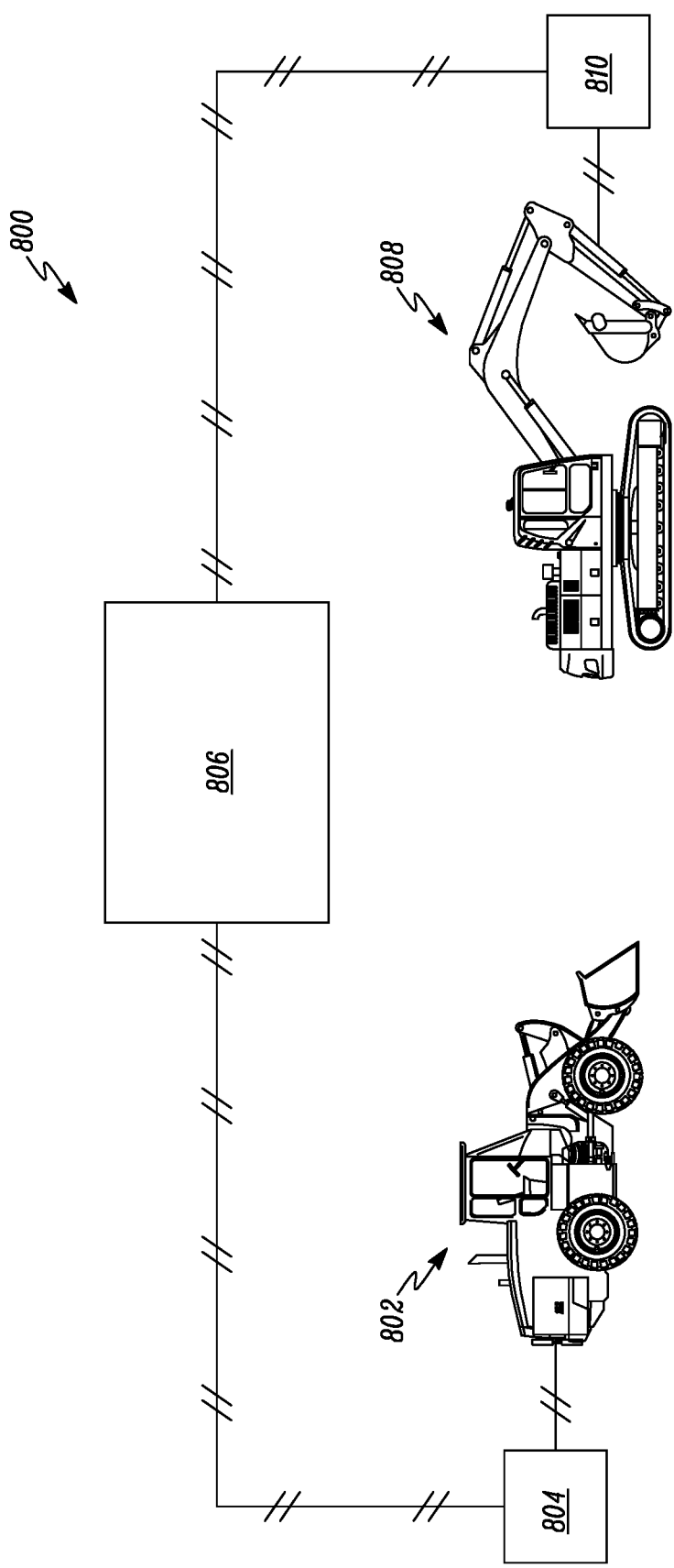
FIG. 8 schematically shows a control system for another control system, according to yet another aspect of the present disclosure.

Another exemplary embodiment of the present disclosure is illustrated through FIG. 8 showing a control system 800. The control system 800 includes a first machine 802 operating on the worksite 100. The first machine 802 has a first telemetry module 804 which generates signals indicative of operational data of first machine 802. The control system 800 further includes a controller 806 associated with the first machine 802. The controller 806 is functionally similar to the controllers 206, 606. The controller 806 is communicably coupled with the first telemetry module 804. The controller 806 is further communicably coupled with the at least one second machine 808. The controller 806 receives the signals indicative of the operational data of the at least one second machine from a second telemetry module 810. The controller 806 processes the received operational data through various steps shown in FIG. 9.

Figure 9:
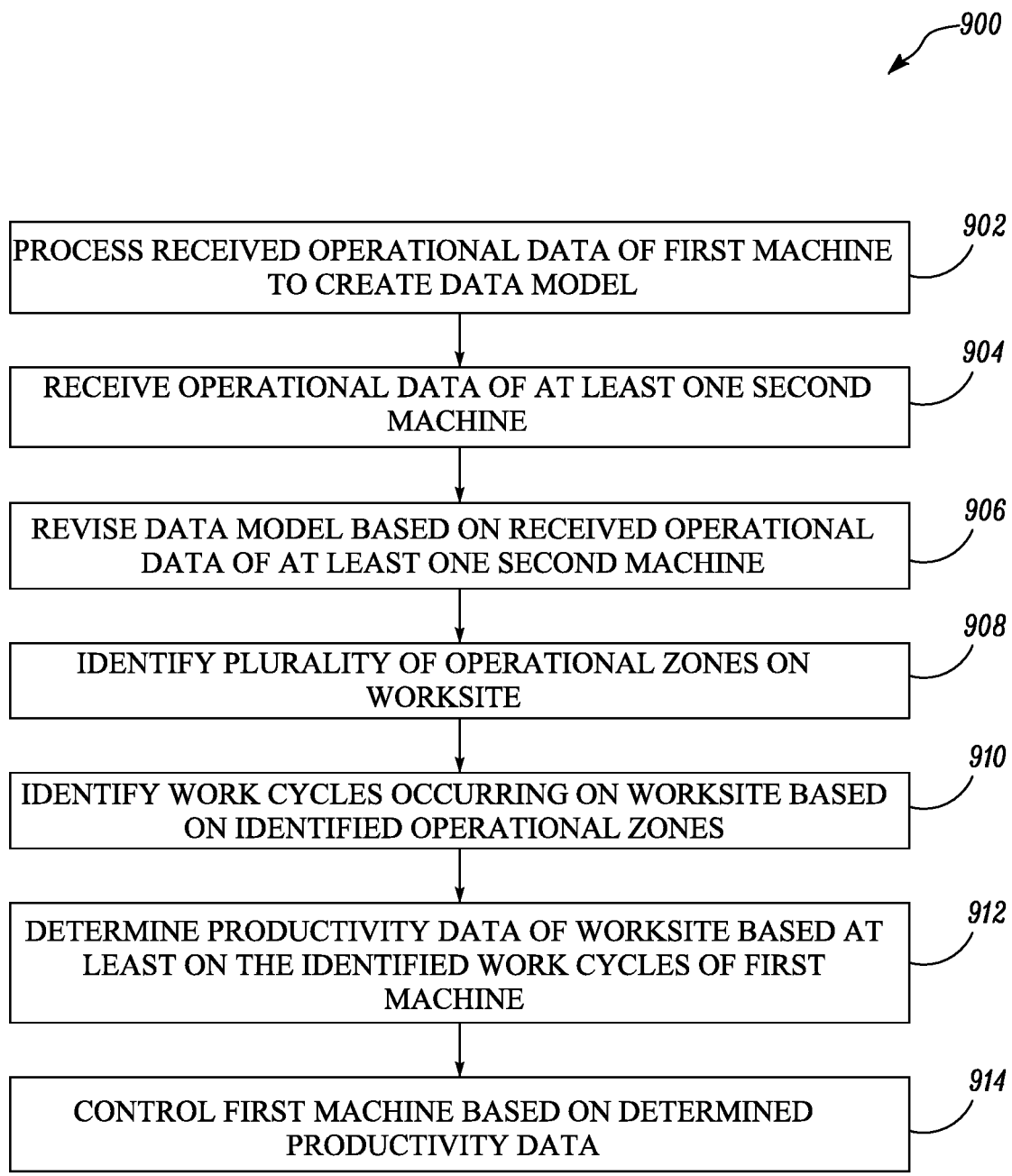
FIG. 9 shows various data processing steps for the control system of FIG. 8, according to yet another aspect of the present disclosure.

As shown in FIG. 9, at step 902, the controller 806 processes the received signals indicative of the operational data of the first machine 802 to create a data model. At step 904, the controller 806 receives the signals indicative of the operational data from the second telemetry module 810. The controller 806 may iteratively repeat steps 902 and 904 based on number of machines included in the at least one second machine 808. At step 906, the controller 806 processes the received signals to revise the created data model. At step 908, the controller 806 identifies plurality of operational zones over the worksite 100 based at least on an analysis of the revised data model. The plurality of operational zones includes one or more of a parking zone, a loading zone, and a dumping zone. At step 910, the controller 806 determines occurrence of work cycles of the first machine 802 on the worksite 100 based at least on the identified operational zones.

At step 912, the controller 806 determines productivity data of the worksite 100 based at least on the identified work cycles of the first machine 802. The productivity data includes one or more of a work cycle ID, work cycle start and stop times, a work cycle segment, a fuel consumption, a distance travelled, a work cycle duration, and a confidence percentage. At step 914, the controller 806 controls the first machine 802 based on the determined productivity data.

INDUSTRIAL APPLICABILITY

The present disclosure provides an improved and inexpensive means to calculate productivity data of the worksite 100, and subsequently control the worksite 100. As explained by the first embodiment, productivity of the worksite is calculated by receiving operational data through one machine. Another embodiment calculates productivity data of the worksite 100 by receiving operational data through multiple machines. Yet another embodiment calculates productivity data of the worksite by creating data model based on operational data of one machine, and then iteratively revising the created model based on the operational data received through other machines.

Operational data in all the embodiments is received through telemetry modules which are relatively inexpensive compared to other productivity analysis devices. This may allow worksite management to equip more and more machines working on the worksite with the telemetry modules. Receiving operational data through more number of machines improves accuracy of calculations as operational data received from various machines can be corroborated. This allow data discrepancies, blind spots and outliers to be easily removed which in turn increases confidence level of the productivity data calculations. Further, accurate productivity data determinations leads to effective corrective measures being taken to improve worksite productivity, and maximize the output of each individual machine and in turn output of the worksite.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system for a machine operating on a worksite, the control system comprising:
   a telemetry module associated with the machine, the telemetry module configured to generate signals indicative of operational data of the machine as the machine moves within the worksite; and
   a controller communicably coupled to the telemetry module, the controller configured to:
      receive the signals indicative of the operational data from the telemetry module corresponding to the movement of the machine within the worksite;
      process the received signals to create a data model corresponding to the movement of the machine within the worksite;
      identify plurality of operational zones over the worksite based at least on an analysis of the created data model corresponding to the movement of the machine within the worksite, the plurality of operational zones including one or more of a parking zone, a loading zone, and a dumping zone;
      determine occurrence of work cycles of the machine over the worksite and a corresponding work cycle confidence level based at least on the identified operational zones and movement of the machine to and from the plurality of operational zones, the work cycles comprising a plurality of segments including at least a loading-related segment, a traveling-related segment, and a dumping-related segment;
      determine productivity data of the worksite based at least on the identified work cycles, the productivity data including one or more of work cycle ID, work cycle start and stop times, work cycle segment, fuel consumption, distance travelled, and work cycle duration; and
      control the machine based on the determined productivity data.

2. The control system of claim 1, wherein processing the received signals to create the data model comprises:
   standardization of the received operational data; and
   simulating the standardized operational data to generate simulated operational data corresponding to time periods for which operational data is not collected by the telemetry module; and
   creating the data model based on the standardized operational data and the simulated operational data.

3. The control system of claim 1, wherein the operational data comprises one or more of a machine speed, machine location timestamp, machine GPS data, machine fuel consumption, and engine start and stop occurrences coupled with GPS data.

4. The control system of claim 1, wherein the parking zone is identified based at least on engine start and stop occurrences and GPS data.

5. The control system of claim 1, wherein the loading zone is identified based at least on a duration of time spent by the machine at a particular location on the worksite.

6. The control system of claim 1, wherein the dumping zone is identified based at least on a duration of time spent by the machine at a particular location, and a distance of the location from the loading zone.

7. A worksite management system comprising:
   a plurality of machines operating on a worksite, wherein each machine from the plurality of machines has an associated telemetry module such that the telemetry module is configured to generate signals indicative of operational data of the corresponding machine from the plurality of machines as the machines move within the worksite;
   a controller communicably coupled with the plurality of machines, the controller configured to:
      receive the signals indicative of the operational data of the plurality of machines from the corresponding telemetry modules corresponding to the movement of the machines within the worksite;

process the received signals to create a data model corresponding to the movement of the machines within the worksite;

identify plurality of operational zones over the worksite based at least on an analysis of the created data model corresponding to the movement of the machines within the worksite, the plurality of operational zones including one or more of a parking zone, a loading zone, and a dumping zone;

determine occurrence of work cycles of each machine from the plurality of machines over the worksite and a corresponding work cycle confidence level based at least on the identified operational zones and movement of each said machine to and from the plurality of operational zones, the work cycles comprising a plurality of segments including at least a loading-related segment, a traveling-related segment, and a dumping-related segment;

determine productivity data of the worksite based at least on the identified work cycles of each machine from the plurality of machines, the productivity data including one or more of work cycle ID, work cycle start and stop times, work cycle segment, fuel consumption, distance travelled, and work cycle duration; and manage the worksite by controlling the plurality of machines based on the determined productivity data.

8. The worksite management system of claim 7, wherein processing the received signals to create the data model comprises:

standardization of the received operational data;

simulating the standardized operational data to generate simulated operational data corresponding to time periods for which operational data is not collected by the telemetry module; and creating the data model based on the standardized operational data and the simulated operational data.

9. The worksite management system of claim 7, wherein the operational data comprises one or more of a machine speed, machine location timestamp, machine GPS data, machine fuel consumption, and engine start and stop occurrences coupled with GPS data.

10. The worksite management system of claim 7, wherein the parking zone is identified based at least on engine start and stop occurrences and GPS data of at least one machine from the plurality of machines.

11. The worksite management system of claim 7, wherein the loading zone is identified based at least on duration of time spent by at least one machine from the plurality of machines at a particular location on the worksite.

12. The worksite management system of claim 7, wherein the dumping zone is identified based at least on a duration of time spent by at least one machine from the plurality of machines at a particular location, and a distance of the location from the loading zone.

13. A control system comprising:

a first machine operating at a worksite, the first machine having a first telemetry module configured to generate signals indicative of operational data of the first machine as the first machine moves within the worksite;

at least one second machine operating at the worksite, the at least one second machine having a second telemetry module configured to generate signals indicative of operational data of the at least one second machine as the second machine moves within the worksite;

a controller associated with the first machine, and communicably coupled with the at least one second machine, the controller configured to:

receive the signals indicative of the operational data from the first telemetry module corresponding to the movement of the first machine within the worksite;

process the received signals to create a data model corresponding to the movement of the first machine within the worksite;

receive the signals indicative of the operational data from the second telemetry module corresponding to the movement of the second machine within the worksite;

process the received signals to revise the created data model;

identify plurality of operational zones over the worksite based at least on an analysis of the revised data model corresponding to the movement of the first and second machines within the worksite, the plurality of operational zones including one or more of a parking zone, a loading zone, and a dumping zone;

determine occurrence of work cycles of the first machine and a corresponding work cycle confidence level based at least on the identified operational zones and movement of at least the first machine to and from the plurality of operational zones, the work cycles comprising a plurality of segments including at least a loading-related segment, a traveling-related segment, and a dumping-related segment;

determine productivity data of the worksite based at least on the identified work cycles of the first machine, the productivity data including one or more of work cycle ID, work cycle start and stop times, work cycle segment, fuel consumption, distance travelled, and work cycle duration; and control the first machine based on the determined productivity data.

14. The control system of claim 13, wherein the operational data comprises one or more of a machine speed, machine location timestamp, machine GPS data, machine fuel consumption, and engine start and stop occurrences coupled with GPS data.

* * * * *